United States Patent [19]
Cadiou

[11] 3,893,260
[45] July 8, 1975

[54] CONTROL DEVICE FOR VEHICLE DOORS AND OTHER MEMBERS

[75] Inventor: Jean G. Cadiou, Paris, France
[73] Assignee: Societe Anonyme Automobiles Citroen, Paris, France
[22] Filed: Apr. 30, 1973
[21] Appl. No.: 355,749

[30] Foreign Application Priority Data
May 2, 1972 France .......................... 72.16015

[52] U.S. Cl. .................. 49/362; 49/357; 49/140; 74/625
[51] Int. Cl.² ........................................ E05F 11/34
[58] Field of Search ............ 49/139, 140, 357, 362; 74/625

[56] References Cited
UNITED STATES PATENTS

| | | | |
|---|---|---|---|
| 2,296,875 | 9/1942 | Ritchie | 74/625 X |
| 3,070,687 | 12/1962 | Marchant | 49/140 X |
| 3,169,413 | 2/1965 | Freeman | 74/625 |
| 3,426,478 | 2/1969 | Sturges et al. | 49/139 X |

Primary Examiner—Kenneth Downey
Attorney, Agent, or Firm—Eyre, Mann & Lucas

[57] ABSTRACT

A sliding automobile door is actuated by a rack and pinion driven by an electric motor through a worm and worm wheel. In the event of failure of the motor the worm and worm wheel can be disengaged by a control slide accessible both from the interior of the vehicle and from beneath the bonnet, hood or other cover of another compartment of the vehicle.

8 Claims, 6 Drawing Figures

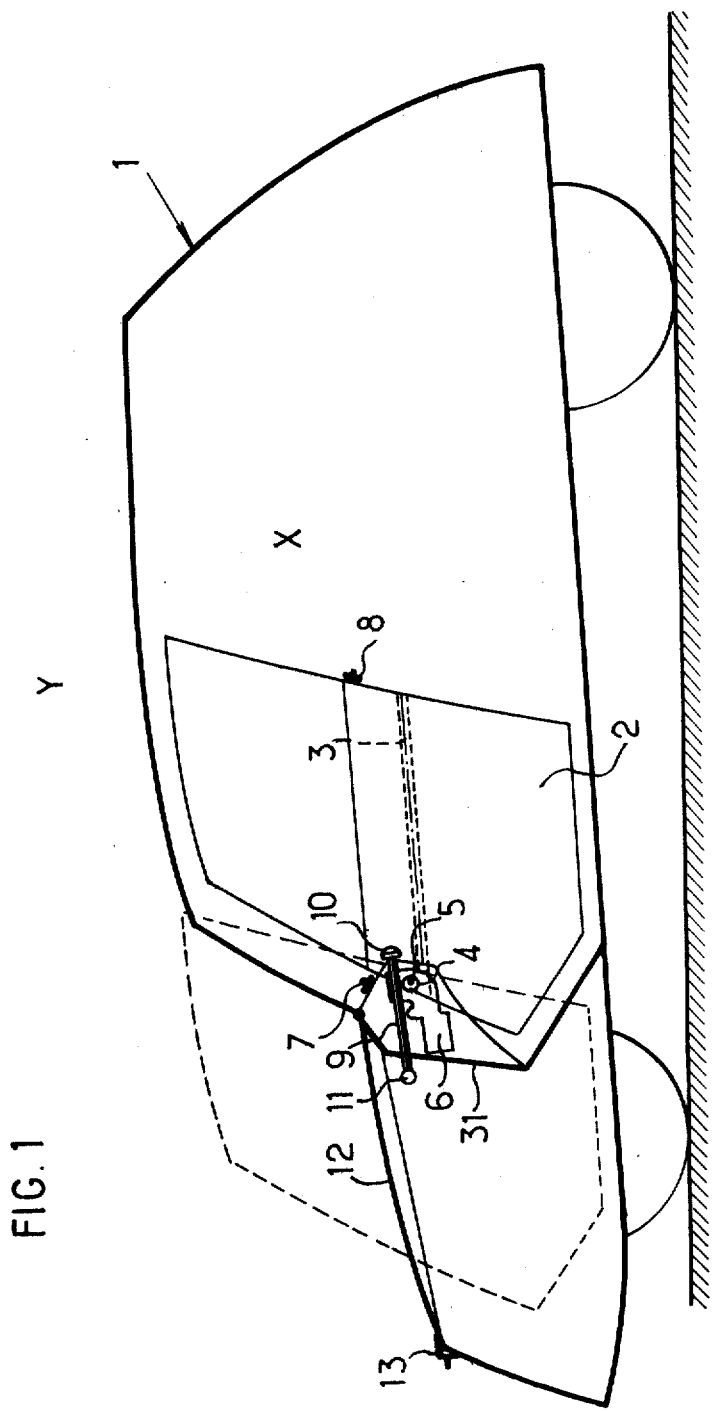

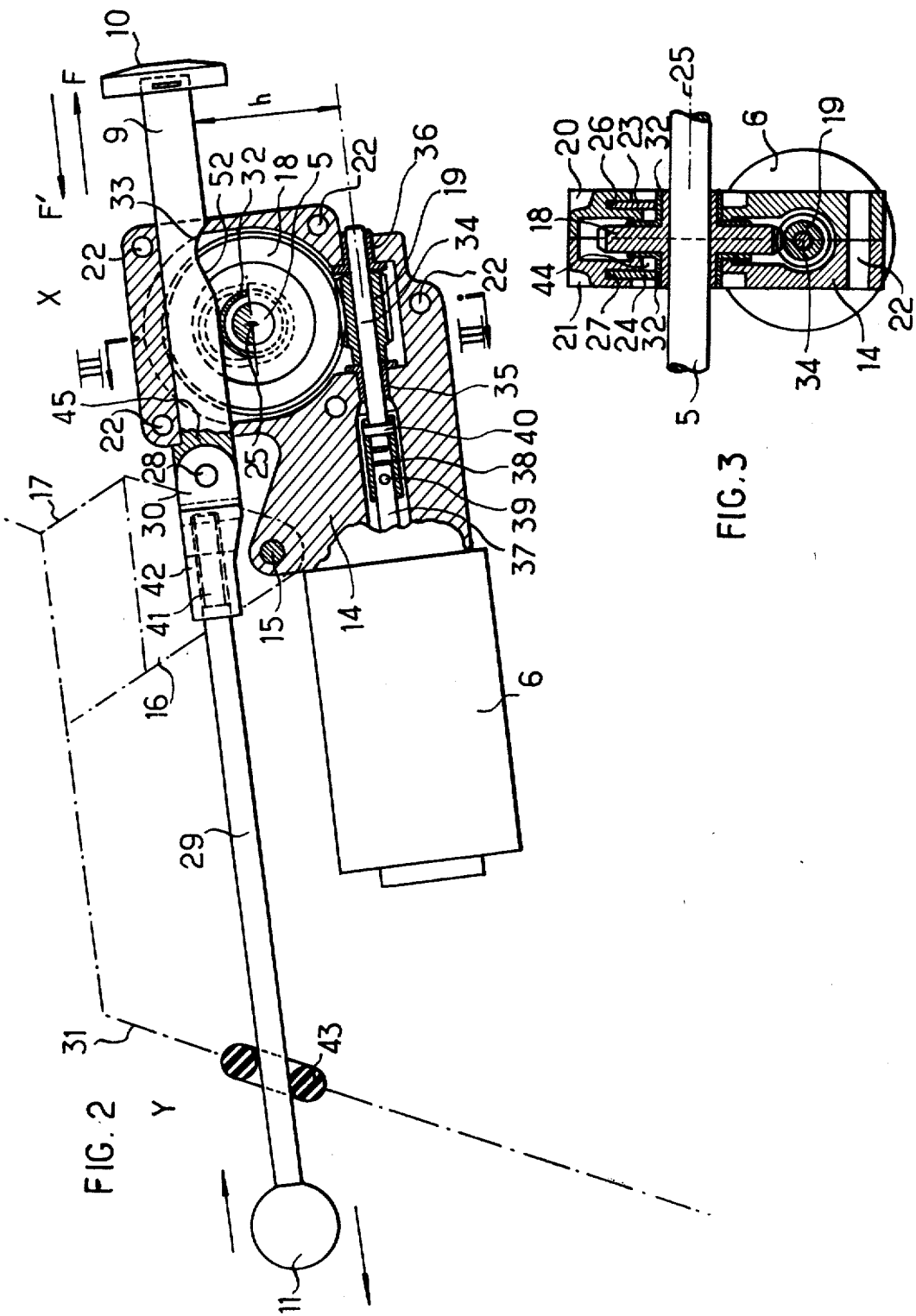

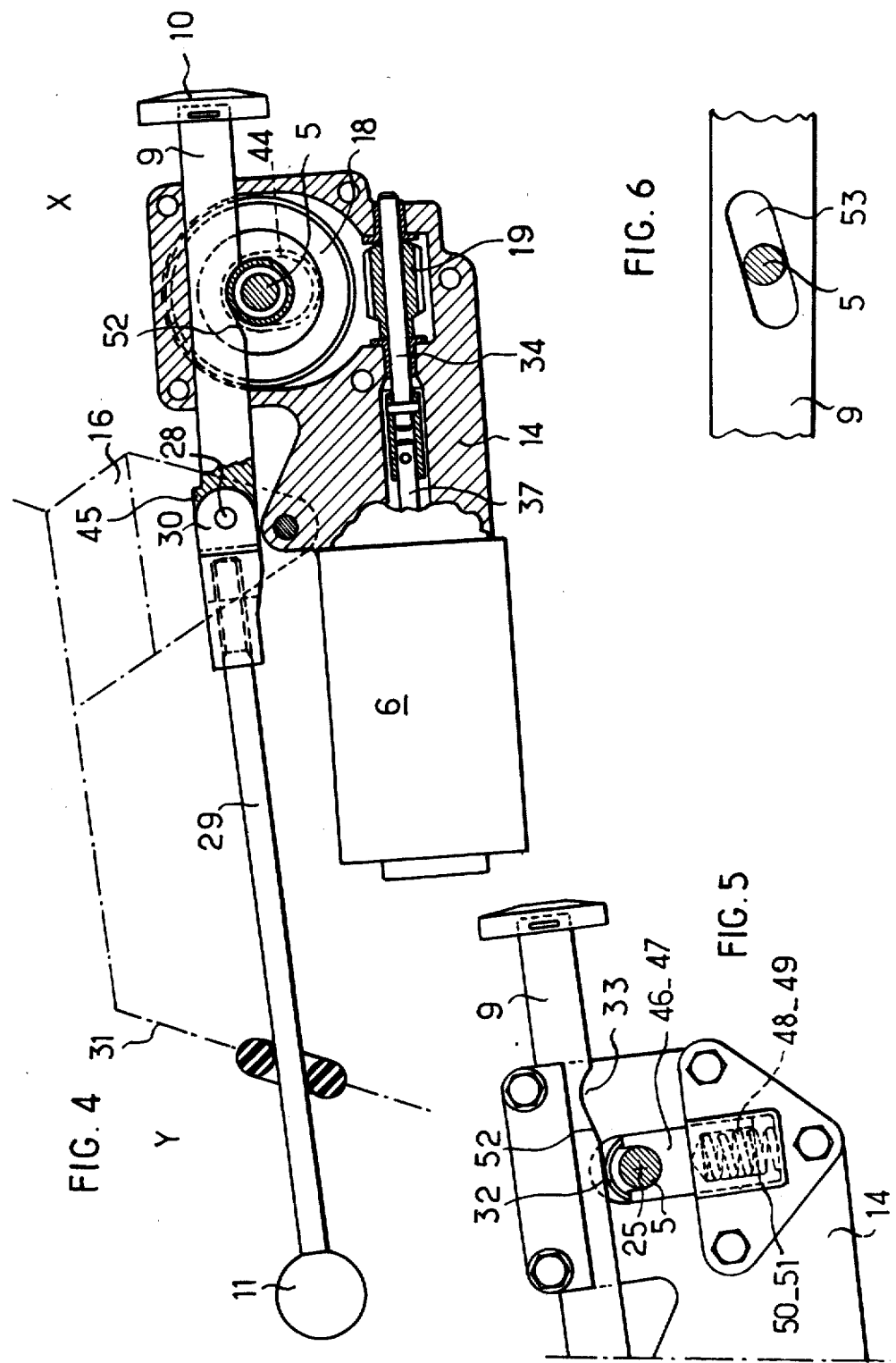

CONTROL DEVICE FOR VEHICLE DOORS AND OTHER MEMBERS

BACKGROUND OF THE INVENTION

1. Field of the Invention

The invention relates to a control device for a movable member, for example a sliding door or the openable roof of an automobile vehicle, a cockpit cover of an aircraft or a gate separating two localities.

2. Description of the Prior Art

To take into account the high rotational speed of the shaft of an electric motor, the transmission between the shaft and a member to be moved is generally of the endless worm type, cooperating with a worm wheel and is thus non-reversible. As a result, in the case of a failure of the power supply, it becomes impossible to move the movable member. This is a substantial disadvantage. If the movable member is an access door to an enclosure, a person in the enclosure is thus shut in and cannot leave. If the movable member is the door of a car or other vehicle, the power supply for the motor is the battery, it is impossible to enter the vehicle or to leave it if the battery is discharged or if the electrical circuit has been damaged, for example as a result of an accident.

The present invention has for its object a control device for a movable element separating two localities, which is improved in such a way as to overcome the disadvantage.

SUMMARY OF THE INVENTION

According to the present invention there is provided a device for controlling the operation of a movable member separating two spaces and disposed in part in a third space, said device comprising an electric motor, a supply circuit of the electric motor including a first switch incorporated in the supply circuit and accessible from one of the two spaces, and a second switch incorporated in the supply circuit and accessible from the other of said two spaces, an actuating mechanism of the movable member, a non-reversible transmission coupling the electric motor and the actuating mechanism, said transmission including a worm, and a worm wheel capable of meshing with the worm, means for disengaging the worm from the worm wheel, said means including a casing carrying the electric motor and the worm, means pivotally mounting the casing, and a control member accessible both in the said one space and in said third space, said control member serving to pivot the casing relatively to the worm wheel whereby disengagement of the worm and worm wheel can be effected.

The transmission, being non-reversible has, to some extent an anti-theft function, although it is impossible, if the transmission is not interrupted, to displace the movable member if the motor cannot be driven. In one preferred embodiment which takes account of this property, the switches and the control handle placed in one of the enclosures is associated with means, for example a lock serving to prevent their actuation by an unauthorised third party.

BRIEF DESCRIPTION OF THE DRAWINGS

An embodiment of a control device in accordance with the invention will now be described, by way of example, with reference to the accompanying diagrammatic drawings, in which:

FIG. 1 is a diagram showing a vehicle, its sliding door, and the device for controlling movement of this door;

FIG. 2 is an elevation of the assembly of the control device in a drive configuration, and with a partial section of the mechanism at the location at which coupling is effected;

FIG. 3 is a section of this mechanism on the line 3—3 of FIG. 2;

FIG. 4 is an elevation and a partial section of the assembly in the configuration in which it is uncoupled;

FIG. 5 shows an example of means for ensuring an automatic return action to the uncoupled configuration; and FIG. 6 shows a modification of means capable of effecting the coupling or the uncoupling of the drive mechanism.

DESCRIPTION OF THE PREFERRED EMBODIMENT

FIG. 1 shows an automobile 1 of which the usable space X is separated from the ambient Y by a sliding door 2. The door is rigid with a toothed rack 3 which meshes with a pinion 4 of which the shaft 5 is connected to the shaft of a motor 6 by a non-reversible transmission. In the supply circuit of the motor 6 there is interposed an internal control switch 7 and an external control switch 8 incorporating a lock. The non-reversible transmission can be coupled by displacement of a slide 9 carrying an internal handle 10 and a handle 11 disposed below the bonnet 12, the latter being lockable by a lock 13.

The door is normally controlled from the interior by actuation of the switch 7, and from the exterior by actuation of the switch 8. In the event of failure of the motor or of the supply circuit of the motor, it can be displaced manually, after disabling the non-reversible transmission by displacement of the slide 9, either from the interior, or from the exterior after opening the bonnet 12. The risk, particularly in the case of an accident, if the installation is put out of action, that the driver and the passengers would be unable to leave the vehicle or be extracted therefrom is thus avoided.

As can be seen more particularly from FIGS. 2 to 4, the motor 6 is rigid with a casing 14 and the assembly is pivotally mounted at 15 on a bracket 16 rigid with a part of the structure of the bodywork 17 (chain lines). The casing 14 contains a reducing type of coupling including a worm wheel 18 and an endless worm 19 on which it is possible to impose a decoupling action. The casing 14, including two semi-shells 20 and 21 held together by bolts 22, is traversed by the slide 9 equipped with the handle 10 and formed from two members 23 and 24 which lie on each side of the toothed worm wheel 18 and perpendicular to its rotational axis 25. Sliding in the interior of grooves 26 and 27 formed in the semi-shells 20 and 21 of the casing 14, the slide 9 is extended beyond a pivot 28 by a rod 29 coupled to the slide 9 through the intermediary of a clevis 30 and penetrates to the interior of the bonnet space by passing through the bulkhead 31 separating the bonnet space and the usable space X containing the control device. The lower portion of each member 23 and 24 of the slide 9 is in abutment with a bush 32 forming a bearing for the toothed wheel 18 and each has a notch 33 engageable on the said bush 32 in the stroke of the slide 9. The worm wheel 18 rotating within the bush 32 is fast for rotation with the transverse drive shaft of the transmission 5 supported by the structure of the vehicle and of which the shaft 25 remains, for this reason, fixed in space, one of its ends carrying the pinion 4.

The shaft 34 of the worm 19, rotating within antifriction bearings 35 and 36, is coupled to the output of the motor shaft 37 through the intermediary of a sleeve 38 locked by means of cylindrical pins 39, 40. It is thus readily accessible and demountable by unbolting the two semi-shells 20 and 21. The length of the rod 29 pivoted to the slide 9 at the clevis 30 can be adjusted by means of a screw-threaded end portion 41 cooperating with a screwed member 42 rigid with the body of the clevis. It is thus possible, either to uncouple the rod 29 from the space below the bonnet by acting on the handle 11, or to effect the control required by the control strokes whilst compensating for dimensional variations inevitably encountered in the structures of vehicles. A ring seal or grommet 43 is provided at the opening of the passage for the rod 29 through the partition 31 separating the useful portion X of the vehicle from the bonnet space and accommodates vibrations in the rod 29, set up by the movement of the motor/reducing gear assembly about its pivot point 15 in the course of control movements, the profile of the portions of the slide 9 in abutment on the bush 32 giving rise to raising or lowering of the casing 14 with respect to the shaft 5 of the toothed worm wheel 18 (effect of the notch 33).

In the coupled position, the various members of the mechanism assume the positions as shown in FIG. 2, the suspended assembly (motor 6/casing 14) is held in its raised position at its pivot axis 15 by the abutment of lower edge portions of the slide 9 and is so maintained on the bush 32 by the effect of gravity (overhang with respect to the pivot 15 eventually accentuated by the use of an auxiliary device). Under these conditions, the slide 9 having been moved to a position of maximum projection by the end of the handle 10 to the interior of the usable space X (in the direction of the arrow F), the point of contact of this slide with the bush 32 is disposed on the rectilinear part of its lower edge beyond the notches 33, the casing 14 is raised by back portions of the slide 9 acting on the base of the grooves 26 and 27 and the transverse drive counter-shaft 5 supporting the toothed worm wheel 18 is in abutment on the lower end of the apertures 44 formed in the sides of the casing 14 and enables relative lowering of the shaft 5 and the casing 14. The distance between the axes of the wheel and worm drive is therefore reduced to the minimum value $h$ corresponding to the conditions for meshing of the pinions and the sliding of the door 2 in one direction or the other direction can thus be effected under the action of the electric motor 6, either, in the case of the operator acting from the outside of the vehicle, with the aid of the switch 8, or with the aid of the switch 7 if the operator is in the interior of the useful portion (enclosure X). In this drive configuration a stop 45 limits further rearwards motion of the slide 9.

If the slide 9 is returned in the direction of the arrow F', the notches 33 just cover the bush 32 and the suspended motor 6/casing 14 assembly pivots downwardly about the point 15 under the action of gravity; the assembly then assumes the configuration as shown in FIG. 4, the worm pinion 19 no longer being in mesh with the toothed worm wheel 18.

It is clear that, according to the end of the control assembly selected (control handles 11 or 10), the coupling or the uncoupling of the control transmission may be effected either from the usable space X or from the bonnet space, in the event of failure of the electric power source, the pivot arrangement 28 of the clevis 30 taking into account variations in the alignment of the rod 29. Thus, when rendering inoperative the coupling by the action on the handle 10, an occupant of the vehicle can leave the usable portion (enclosure X) by operating the freed door 2 manually. Moreover, an external user of the vehicle has the possibility of access to the handle 11 by raising the bonnet or hood 12, after having unlocked the locking member 13.

In order to ensure positively and certainly the uncoupling of the wheel 18 and the worm 19, it is possible to provide an auxiliary device which, in the embodiment illustrated in FIG. 5, comprises two lateral biasing members 46 and 47 acting on the counter-shaft 5, (on one and the other side of the casing 14) under the action of springs 48 and 49 disposed in the interior of receptacles or guides 50, 51 rigid with the sides of the casing 14. The support reaction thus reinforced at the level of the shaft 5, ensures pivoting of the motor 6/casing 14 assembly about the pin 15 and, as a result, that of the worm 19 which is rigid therewith. A ramp 52 assists in the engagement of the notches with the rectilinear edges of the lower part of the control slide 9, and causes during the process of meshing the parts, biassing action enabling the reduction in the distance between the axes of the wheel and worm to the required value $h$.

It is clear that the device described can be the subject of modifications or variations of various kinds without departing from the scope of the invention; in particular the notches 33, formed in portions of the double body of the slide 9, may be, for example, replaced by an inclined aperture 53 in the slide 9 as shown diagrammatically at FIG. 6 (the drive shaft 5 passing through the slide member 53 thus provided). Moreover, the double members 23 and 24 forming the slide can be substituted by a single part member acting on one side only of the bush 32.

The possibility of uncoupling of the rod 29 equipped with the handle 11, renders it possible to envisage the existence of a space below the bonnet or hood which is not lockable, (omission of the lock 13) whilst conserving fully guarantees of security against theft conferred on the vehicle, the member 11/29 serving for the user as a substitute for the omitted lock. Another solution enabling the meshing and unmeshing of the rod 29 equipped with its handle 11, from the exterior of the vehicle will enable the predetermined functions without moreover omitting the protection of the space below the bonnet or hood locked by the member 13.

It will be evident that the present invention should not be considered to be limited to the embodiment described and shown but covers, on the contrary, all modifications. In particular, although there has been described and shown the application of the control device according to the invention to the control of a sliding door of an automobile vehicle the uses of the invention extend beyond this particular application.

I claim:

1. In a device for controlling the operation of a movable member separating two spaces and disposed in part in a third space, said device comprising an electric motor, a first switch for selective activation of the electric motor from one of the two spaces, and a second switch for selective activation of the electric motor from the other of said two spaces, an actuating mechanism for the movable member, a non-reversible transmission coupling the electric motor and the actuating mechanism, said transmission including a worm, and a worm wheel rotatably mounted and coupled to the actuating mechanism and being so positioned that it is capable of engagement with the worm, the improvement comprising:

means for disengaging the worm from the worm wheel, said means including a casing carrying the electric motor and the worm which is rotatably mounted in said casing and driven by said motor and said worm wheel also being located within the confines of said casing, said casing being so weighted and pivotally mounted that the worm is constantly urged away from the position of engagement with the worm wheel by the force of gravity, and a control member accessible both in the said one space and in said third space, said control member being slidably disposed in said casing and operable to pivot the casing and the worm rotatably mounted therein to urge the worm into engagement with the worm wheel against the force of gravity urging the worm away from the worm wheel.

2. A device according to claim 1, wherein said control member comprises a slide member slidable in the said casing and having a notch therein, a handle at one end of the slide member, said slide being supported on the worm wheel and movable relative thereto whereby in cooperation with the notch, the casing is permitted to pivot and thereby disengage drive through the transmission.

3. A device according to claim 1, wherein said control member comprises a slide member slidable in the casing and having a notch therein, and said device further comprises a shaft mounting the worm wheel and a bush rotatably mounting the shaft, movement of the slide member along the member permitting the bush to engage in the notch and thus permit pivoting of the casing to enable disengagement of the transmission.

4. A device according to claim 2, wherein the slide member includes two parts, one being disposed on each side of the worm wheel.

5. A device according to claim 2, wherein the control member further comprises a rod and a handle mounted on the rod, said handle being located within the third space.

6. A device according to claim 5, wherein the rod can be detached from the slide.

7. A device according to claim 1, wherein one said space of the two spaces is the useful space enclosed by an automobile, the other said space of the two spaces is the ambient and the third space is that enclosed below the hood of the automobile, said space below the hood having therein a handle secured to the control member.

8. In a device for controlling the operation of a movable member separating two spaces and disposed in part in a third space, said device comprising:

an electric motor, a first switch for selective activation of the electric motor from one of the two spaces, and a second switch for selective activation of the electric motor from the other of said two spaces, an actuating mechanism for the movable member, a non-reversible transmission coupling the electric motor and the actuating mechanism, said transmission including:

a worm, and a worm wheel rotatably mounted and coupled to the actuating mechanism and being so positioned that it is capable of engagement with the worm, the improvement comprising:

means for disengaging the worm from the worm wheel, said means including a casing carrying the electric motor and the worm which is rotatably mounted in said casing and driven by said motor and said worm wheel also being located within the confines of said casing, said casing being pivotally mounted, means biasing said casing for constantly urging the worm away from the position of engagement with the worm wheel, and a control member accessible both in the said one space and in said third space, said control member being slidably disposed in said casing and operable to pivot the casing and the worm rotatably mounted therein to urge the worm into engagement with the worm wheel against the means biasing said casing to urge the worm away from the worm wheel.

* * * * *

UNITED STATES PATENT OFFICE
CERTIFICATE OF CORRECTION

PATENT NO. : 3,893,260
DATED : July 8, 1975
INVENTOR(S) : Jean G. Cadiou

It is certified that error appears in the above-identified patent and that said Letters Patent are hereby corrected as shown below:

Claim 3 - Col. 5, Line 47: The word "member" second occurrence, should be
be deleted and --worm sheel shaft-- inserted therefor Signed and Sealed this thirtieth Day of September 1975

[SEAL]

Attest:

RUTH C. MASON
Attesting Officer

C. MARSHALL DANN
Commissioner of Patents and Trademarks